United States Patent Office 3,793,370
Patented Feb. 19, 1974

3,793,370
β-AMINOETHYLSULFONIUM COMPOUNDS AND PROCESS FOR THE MANUFACTURE THEREOF
Rolf Fikentscher and Felix Miksovsky, Ludwigshafen, Germany, assignors to Badische Anilin- & Soda-Fabrik Aktiengesellschaft, Ludwigshafen (Rhine), Germany
No Drawing. Filed Mar. 18, 1971, Ser. No. 125,899
Int. Cl. C07c 87/04
U.S. Cl. 260—501.1    5 Claims

ABSTRACT OF THE DISCLOSURE

Manufacture of β-aminoethylsulfonium compounds by reacting a thioether with an aziridine and an acid, and the novel β-aminoethylsulfonium compounds themselves. The compounds of the invention are curing agents, crosslinking agents, antistatic agents, emulsifiers, fungicides and valuable intermediates in the preparation of such agents.

This invention relates to a process for the manufacture of β-aminoethylsulfonium compounds by reacting a thioether with an aziridine and an acid.

It is known to prepare sulfonium compounds by reacting thioethers with alkylating agents (Houben-Weyl, "Methoden der Organischen Chemie," vol. 9, pp. 175 et seq.; Reid, "Organic Chemistry of Bivalent Sulfur," vol. 2, pp. 66 et seq.). However, β-aminoethylsulfonium compounds cannot be obtained by these methods.

It is an object of the invention to provide a new process for the manufacture of β-aminoethylsulfonium compounds in a simple and economical manner and in good yield and purity.

It is another object of the invention to provide the novel β-aminoethylsulfonium compounds.

We have found that β-aminoethylsulfonium compounds of the general formula:

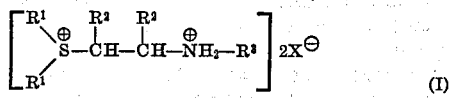

in which the individual radicals $R^1$, $R^2$ and $R^3$ may be the same or different and each stands for an aliphatic, araliphatic or aromatic radical, $R^2$ and/or $R^3$ may also each stand for a hydrogen atoms, and X denotes an acid residue, may be advantageously obtained when thioethers of the general formula:

$$R^1—S—R^1 \quad \text{(II)}$$

in which $R^1$ has the meanings stated above, are reacted with aziridines of the general formula:

in which $R^2$ and $R^3$ have the meanings stated above, and an acid of the general formula:

$$HX \quad \text{(IV)}$$

in which X has the meaning stated above.

The reaction may be represented by the following scheme illustrating the use of thiodiglycol, ethylene imine and sulfuric acid:

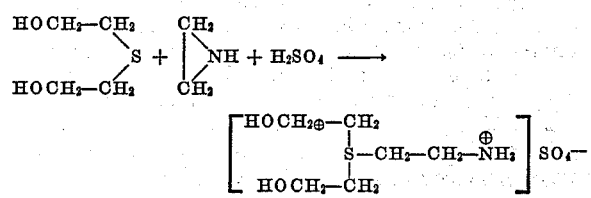

The process of the invention provides a large number of novel β-aminoethylsulfonium compounds in good yield and purity in a simple and economical manner. Since alkylene imine compounds very readily polymerize to polyalkylene imines in acid media, it could not have been foreseen that they react with acids and thioethers to form definite compounds of low molecular weight.

The starting materials II, III and IV may be reacted together in stoichiometric amounts or with an excess of any one starting material over the other two. Preferred starting materials II and III and thus preferred end products of Formula I are those, in the formulae of which the individual radicals $R^1$, $R^2$ and $R^3$ are the same or different and each denotes alkyl of from 1 to 20 and preferably from 1 to 7 carbon atoms, aralkyl of from 7 to 12 carbon atoms or phenyl, and $R^2$ and/or $R^3$ may also denote hydrogen and X denotes an acid residue. The said radicals may be further substituted by groups which are inert under the conditions of the reaction, for example hydroxy groups, alkoxy and alkyl groups each of from 1 to 4 carbon atoms, carbalkoxy, acylamino and acyl groups each of from 2 to 20 and preferably from 2 to 6 carbon atoms. If the thioethers II are polymeric thioethers containing two or more thioether groups in the molecule, the products obtained are the corresponding bis- or poly-aminoethylsulfonium compounds. Such polymers may be copolymers containing, for example, vinylthioethanol as comonomer.

Example of suitable thioethers for use as starting material II are: bis - (β - hydroxyethyl)thioether, phenyl-β-hydroxyethylthioether, ethyl - β - hydroxyethylthioether, dodecylmethylthioether, dodecyl - β - hydroxyethylthioether, octadecyl - β - hydroxyethylthioether, dibenzylthioether, dimethylthioether and dibutyl thiodipropionate.

Suitable starting materials III are, for example, ethylene imine, 2 - methylethylene imine, N - methylethylene imine, N - ethylethylene imine, N - (β - hydroxyethyl) ethylene imine, N-(β - formylaminoethyl)ethylene imine, 2 - phenylethylene imine, 2,3 - dimethylethylene imine, 2 - ethyl - 3 - methylethylene imine, 2 - benzylethylene imine, N - phenyl - 2 - methylethylene imine, N-benzylethylene imine, N - β - ethoxyethylene imine, N-p-toluylethylene imine and stearic acid β-(n-ethylene-imino)-ethylamide.

Suitable starting materials IV are inorganic acids, organic acids or Lewis acids of the General Formula IV. For a definition of Lewis acid reference is made to Ullmanns Encyklopädie der technischen Chemie, vol. 15, pp. 2–3 and vol. 18, pp. 66–67. In place of monobasic acids equivalent amounts of polybasic acids may be used.

Examples of suitable acids are: perchloric acid, sulfuric acid, phosphoric acid, nitric acid; sulfonic acids such as benzene and p-toluene sulfonic acids; boron-containing acids such as boric acid and fluoboric acid; aliphatic carboxylic acids such as chloroacetic acid, acrylic acid; aliphatic carboxylic acids such as chloroaceti aid, arylic acid, oxalic acid, formic acid, acetic acid, adipic acid and maleic acid; and Lewis acids such as the adducts of ethanol and boron trifluoride or boron trichloride.

The acids may be used in a concentrated form and in admixture with each other and/or with a solvent, especially water.

The reaction is usually carried out at a temperature between −10° and +100° C., preferably between 0° and 80° C., at atmospheric or superatmospheric pressure, continuously or batchwise. It is advantageous to use organic solvents which are inert under the conditions of the reaction, for example alkanols such as methanol, ethanol and n-butanol; cyclic ethers such as dioxane and tetrahydrofuran; or appropriate mixtures. Alternatively, one of the starting materials, for example acetic acid or a liquid thioether, may serve as a solvent for the reaction.

The reaction may be carried out as follows: a mixture of the starting material II, III and IV and solvent, if used, is maintained at the reaction temperature for from 2 to 40 hours. It is frequently advantageous to prepare a mixture of the thioether and the acid and then to add the starting material III. The product is then isolated from the mixture in the usual way, for example by filtration or by removing the solvent and precipitating the product with, say, diethyl ether, acetone or methanol.

The novel compounds produced by the process of the invention are curing agents, cross-linking agents, antistatic agents, emulsifiers, fungicides and valuable starting materials for the manufacture of such substances. Due to the fact that the compounds decompose at elevated temperatures, for example above 100–140° C., to liberate acids, they are useful as latent acid donors for curing amino resins or polyester resins, when they are used, for example, in a proportion of from 0.1 to 10 g./kg. of resin. Alkyl chains of from 10 to 20 carbon atoms on the sulfur atom are advantageous for compounds having surface activity, for example antistatic agents for synthetics textiles or emulsifiers for the preparation of water-in-oil or oil-in-water emulsions. The following examples illustrate uses of the products. In the following examples the parts are by weight.

EXAMPLE 1

(a) To 458 parts of thiodiglycol in 500 parts of methanol there are added 275 parts of concentrated sulfuric acid at from 0–5° C. 108 parts of ethylene imine are then slowly added at 20° C. over 90 minutes. Near the completion of the addition of ethylene imine a solid substance precipitates from the reaction mixture. The mixture is maintained at 30–35° C. for a further 2 hours and the crude product is then filtered off. There are thus obtained 612 parts (93% of theory based on ethylene imine) of bis-$\beta$-hydroxyethyl-$\beta$-aminoethylsulfonium sulfate, M.P. 153–156° C. After recrystallization from acetic acid/methanol the melting point is 164° C. In this and the following examples, the elementary analysis agrees with the theoretical values within the limits of error.

(b) If the reaction is carried out using thiodiglycol as solvent, there is obtained, after distilling off the excess thiodiglycol under reduced pressure and precipitating with methanol, 645 parts of product (98% of theory).

EXAMPLE 2

55 parts of concentrated sulfuric acid are added, at 5° C. over 30 minutes, to a mixture of 122 parts of thiodiglycol, 70 parts of dioxane and 21.5 parts of ethylene imine. On completion of the addition of the acid stirring is continued without cooling. The temperature of the mixture rises to 40° C. and the product crystallizes out. It is filtered off and washed with methanol. There are thus obtained 127 parts (96% of theory based on ethylene imine) of bis-3-hydroxyethyl-$\beta$-aminoethylsulfonium sulfate.

The product imparts very good antistatic properties to nylon. Nylon strands treated with an aqueous solution of 1 g. of product in 1 l. of water show no static electrification after drying and storing under standard conditions (20° C., 65% relative humidity). Untreated nylon strands, however, show a charge of −1,400 volts.

EXAMPLE 3

50 parts of concentrated sulfuric acid are added, at 20° C., to 106 parts of ethyl-$\beta$-hydroxyethylthioether in 100 parts of methanol. To this solution there are then added, at 20–25° C. over 45 minutes, 21.5 parts of ethylene imine in 100 parts of methanol and the mixture is then held at 20–30° C. for 1 hour and at 30–50° C. for 2 hours. 400 parts of acetone are added to the reaction solution and 106 parts (86% of theory based on ethylene imine) of ethyl-$\beta$-hydroxyethyl - $\beta$ - aminoethylsulfonium sulfate crystallize out. The product has a melting point of 143° C. after recrystallization from methanol/acetone.

EXAMPLE 4

290 parts of dibutyl thiodipropionate and 38 parts of p-toluene sulfonic acid are mixed together and 30 parts of n-butanol are then added. A solution is formed which is clear at room temperature. To this solution there are then added, at 10–15° C. with cooling, 4.3 parts of ethylene imine, and the mixture is then heated to 45° C. over 2 hours and held at 45° C. and 3.5 hours. After cooling to room temperature, the mixture is stirred into 1,500 parts of diethyl ether. The supernatant liquid is decanted from the precipitated syrupy solid. After drying, there are obtained 38 parts (56% of theory based on ethylene imine) of bis-$\beta$-carbobutoxyethyl-$\beta$-aminoethylsulfonium bis-p-toluenesulfonate.

EXAMPLE 5

8.6 parts of ethylene imine in 20 parts of ethanol are added, at 10–20° C., to 65 parts of dodecylmethylthioether in 120 parts of ethanol. The mixture is cooled with a mixture of ice and water while 25 parts of concentrated sulfuric acid are slowly added over 25 minutes. The resulting solution is heated to 45° C. over 2 hours and then filtered to remove a small amount of precipitate. The filtrate is then concentrated to 98 parts by evaporated under reduced pressure. The residue is digested 4 times with 40 parts of ether and the resulting waxy solid is dried under reduced pressure. There are thus obtained 63 parts (88% of theory based on ethylene imine) of dodecylmethyl-$\beta$-aminoethylsulfonium sulfate.

EXAMPLE 6

To a mixture of 222 parts of dodecyl-$\beta$-hydroxyethylthioether, 120 parts of methanol and 65 parts of concentrated sulfuric acid there are slowly added, at 15–20° C., 25.8 parts of ethylene imine over 20 minutes. The mixture is then heated to 30° C., a clear reaction solution being formed. The solution is stirred for 4 hours at 30–40° C. and then stirred into 4,000 parts of ether. The product precipitates in the form of a fine white crystalline powder. It is sparingly soluble in water and its melting point is 142–144° C. after washing with methanol and isopropanol. There are obtained 190 parts (82% of theory based on ethylene imine) of dodecyl-$\beta$-hydroxyethyl-$\beta$-aminoethylsulfonium sulfate.

EXAMPLE 7

To a solution of 49 parts of dodecyl-$\beta$-hydroxyethylthioether in 40 parts of methanol there are added, at 18–20° C., 58.5 parts of a 68.8% w./w. aqueous perchloric acid solution at room temperature, and the mixture is then stirred at room temperature for 16 hours. After evaporation of the solvent under reduced pressure, a partial crystalline residue is obtained which is dissolved in acetic acid and reprecipitated with ligroin. There are thus obtained 78 parts (76% of theory based on ethylene imine) of dodecyl-$\beta$-hydroxyethyl-$\beta$-aminoethylsulfonium bis - perchlorate in the form of a waxy water-soluble product.

EXAMPLE 8

(a) 8.6 parts of ethylene imine are added, at 10° C. over 1 hour, to 49.2 parts of dodecylthioethanol in 96 parts of glacial acetic acid and the mixture is then stirred under a blanket of nitrogen for 18 hours at 20° C. The reaction solution is then evaporated to dryness under reduced pressure at a temperature below 50° C., and the residue is extracted with ligroin and dried. There are thus obtained 74.5 parts (90% of theory based on ethylene imine) of dodecyl-$\beta$-hydroxyethyl-$\beta$-aminoethylsulfonium bis-acetate in the form of a pale yellow, water-soluble oil.

(b) In a similar manner, dodecyl thioethanol may be reacted with acrylic acid (stabilized with 0.02% by weight of hydroquinone) to form 60 parts of dodecyl-$\beta$-hydroxyethyl-$\beta$-aminoethylsulfonium bis-acrylate.

EXAMPLE 9

56.7 parts of boron trifluoride etherate are added, at 20° C., to a solution of 24.5 parts of bis-hydroxyethyl-thioether in 50 parts of absolute methanol, and 8.6 parts of ethylene imine dissolved in 20 parts of methanol are then slowly added at 5–10° C. The mixture is stirred for 3 hours at 15–30° C., 2 layers being formed. The reaction mixture is shaken with 150 parts of isopropanol and then twice with 140 parts of ethyl alcohol, and the residue which is not soluble in the solvent is freed from solvent under reduced pressure. There are thus obtained 38.5 parts (64% of theory based on ethylene imine) of bis-β-hydroxyethyl-β-aminoethylsulfonium boron trifluoride etherate in the form of a viscous water-soluble syrup.

EXAMPLE 10

A solution of 33 parts of octadecyl-β-hydroxyethylthio-ether and 38.5 parts of p-toluene sulfonic acid in 20 parts of ethanol is heated at 45° C. while 4.3 parts of ethylene imine in 5 parts of ethanol are added over 15 minutes at a temperature of 40–50° C. The clear reaction solution is maintained at 40° C. for a further 4 hours. The mixture is then cooled and partial crystallization occurs. The crystalline residue is stirred into 400 parts of acetic acid and the precipitate is filtered off. There are thus obtained 45 parts (63% of theory based on ethylene imine) of octadecyl - β - hydroxyethyl - β - aminoethylsulfonium bis-p-toluene-sulfonate, M.P. 116–118° C. after recrystallization from isopropanol. The product is soluble in water and is precipitated in the presence of sulfate ions, when it forms a sparingly soluble sulfate.

The product imparts very good antistatic properties to polyester or polyacrylonitrile yarns when applied thereto from a 0.1% aqueous solution. After drying and storing under standard conditions (20° C., 65% relative humidity), the synthetic yarns show no electrostatic charge, whilst untreated strands show a charge of —800 volts (polyester) or —400 volts (polyacrylonitrile). The product is also a very good emulsifier for spindle oil or trichloroethylene. For example, the product is used in a concentration of from 2.5 to 10 parts in 50 parts of the organic solvent to be emulsified and 40 to 1000 parts of water.

EXAMPLE 11

56.7 parts of 90% p-toluene sulfonic acid are dissolved in 231 parts of phenyl-β-hydroethylthioether and 6.5 parts of ethylene imine are slowly added at from 10° to 20° C. The mixture is then held at 40° C. for 12 hours, cooled to room temperature and drowned in 1,000 parts of diethyl ether. A precipitate is formed consisting of 79 parts (97.5% of theory based on ethylene imine) of crude phenyl-β-hydroxyethyl-β-aminoethylsulfonium bis-p-toluene-sulfonate, M.P. 144° C. after recrystallization from alcohol or isopropanol.

EXAMPLE 12

23 parts of N-methylethylene imine dissolved in 60 parts of methanol are added, at 12–19° C., to a mixture of 49 parts of thiodiglycol, 120 parts of methanol and 154 parts of 90% aqueous p-toluene sulfonic acid. The mixture is then stirred at room temperature for 14 hours. The reaction solution is then poured into cold acetic acid to precipitate a solid material which crystallizes after repeated digestion with acetic acid. There are thus obtained 130 parts (62% of theory based on ethylene imine) of bis-β-hydroxyethyl-β-N-methylaminoethylsulfonium bis-p-toluene-sulfonate, M.P. 43–45° C. (recrystallized from acetic acid/isopropanol).

EXAMPLE 13

14.2 parts of N-ethylethylene imine in 30 parts of methanol are added, at 15° C., to a mixture of 49 parts of dodecyl-β-hydroxyethylthioether, 40 parts of methanol and 77 parts of 90% p-toluene sulfonic acid. After 12 hours at 20–25° C., 800 parts of diethyl ether are added. The precipitated product crystallizes. There are thus obtained 91 parts (69% of theory based on ethylethylene imine) of dodecyl-β-hydroxyethyl-p-N-ethylaminoethyl-sulfonium bis-p-toluene-sulfonate, M.P. 76–79° C. (recrystallized from acetic acid).

EXAMPLE 14

Example 13 is repeated except that the N-ethylethylene imine used in that example is replaced by 17.4 parts of N-β-hydroxyethylethylene imine. There are obtained 69.5 parts of dodecyl-β-hydroxyethyl-β-(N-β′-hydroxyethyl)-aminoethylsulfonium bis - p - toluene-sulfonate (51% of theory based on the starting material), M.P. 94° C. (recrystallized from acetic acid/isopropanol).

EXAMPLE 15

To 45.3 parts of thiodiglycol in 200 parts of methanol there are added, at room temperature, 78 parts of 90% w./w. p-toluene sulfonic acid followed by 70.5 parts of stearic acid β-(N-ethylene-imino)-ethylamide dissolved in 100 parts of methanol. The mixture is stirred at room temperature for 18 hours and then heated at 50–60° C. for 20 minutes, volatile portions then being distilled off under reduced pressure. The residue consists of 148 parts of N - stearoyl-N′-β-[bis-(β-hydroxyethyl)-sulfoniumethyl]-ethylenediamine bis-p-toluene-sulfonate in the form of a yellowish waxy water-soluble solid.

EXAMPLE 16

A solution of 11.4 parts of 2-methylethylene imine in 30 parts of methanol is added, at 15° C., to a solution of 49 parts of dodecyl-β-hydroxyethylthioether and 77 parts of 90% w./w. p-toluene sulfonic acid containing water of crystalilzation in 40 parts of methanol, and the mixture is then stirred for 24 hours at room temperature. The solvent is dstilled off under reduced pressure and the residue crystallizes. There are thus obtained 109 parts (84% of theory based on 2-methylethylene imine) of dodecyl-β-hydroxyethyl - β - aminopropylsulfonium bis-p-toluene-sulfonate, M.P. 115° C. after recrystallization from acetic acid/isopropanol.

EXAMPLE 17

To a solution of 62 parts of dimethyl sulfide in 300 parts of methanol there are added, at 15–20° C., 50 parts of concentrated sulfuric acid followed, at 20–25° C. over 20 minutes, by 21.5 parts of ethylene imine in 80 parts of methanol. The mixture is held at 25° C. for 2 hours and then heated under reflux for 30 minutes. A crystalline precipitate is formed. The mixture is cooled and the precipitated solid is filtered off and washed with methanol and ether. After drying, there are obtained 87 parts (85% of theory) on bis-methyl-β-aminoethylsulfonium sulfate, M.P. 168° C. after recrystallization from acetic acid/methanol.

We claim:
1. A process for the manufacture orf β-aminoethylsulfonium compounds of the general formula:

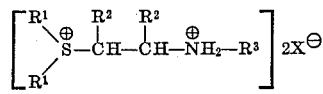

in which the individual radicals $R^1$, $R^2$ and $R^3$ may be the same or different and each denotes an aliphatic, araliphatic or aromatic radical, $R^2$ and $R^3$ may also denote hydrogen and X is the anion of an inorganic, organic, or Lewis acid which comprises reacting thioethers of the general formula:

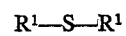

in which R¹ has the meanings stated above, with arizidines of the general formula:

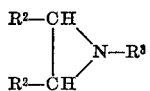

in which R² and R³ having the meanings stated above, and an acid of the general formula:

HX in which X has the meaning stated above.

2. β-Aminoethylsulfonium compounds of the general formula:

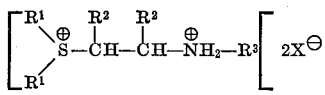

in which the individual radicals R¹, R² and R³ may be the same or different and each stands for alkyl of from 1 to 20 carbon atoms, aralkyl of from 7 to 12 carbon atoms or phenyl, R² and R³ may each also stand for a hydrogen atom, and X is the anion of an inorganic, organic, or Lewis acid.

3. A process as claimed in claim 1, in which the reaction is carried out at a temperature between —10° and +100° C.

4. A process as claimed in claim 1, in which the reaction is carried out at a temperature of from 0° to 80° C.

5. A process as claimed in claim 1, in which the reaction is carried out in the presence of organic solvents which are inert under the conditions of the reaction.

References Cited

UNITED STATES PATENTS 2,877,265   3/1959   Doyle et al. ____ 260—583 EE X

LEWIS GOTTS, Primary Examiner

R. L. RAYMOND, Assistant Examiner

U.S. Cl. X.R.

260—501.21, 570.5 R, 570.5 S, 583 EE, 584 R, 584 C

UNITED STATES PATENT OFFICE
CERTIFICATE OF CORRECTION

Patent No. 3,793,370　　　　　　　Dated February 19, 1974

Inventor(s) Rolf Fikentscher and Felix Miksovsky

It is certified that error appears in the above-identified patent and that said Letters Patent are hereby corrected as shown below:

Column 2, line 56, "chloroaceti" should read -- chloroacetic --.

Column 2, line 56 "aid" should read -- acid --.

Column 2, line 57, "arylic" should read -- acrylic --.

Column 4, line 11, "and" second occurrence should read -- for --.

Column 5, line 47, "hydroethylthioether" should read -- hydroxyethylthioether --.

Column 6, line 35, "crystalilzation" should read -- crystallization --.

Column 6, line 37, "dstilled" should read -- distilled --.

Column 6, line 59, "orf" should read -- of --.

Signed and sealed this 31st day of December 1974.

UNITED STATES PATENT OFFICE
CERTIFICATE OF CORRECTION

Patent No. 3,793,370          Dated February 19, 1974

Inventor(s) Rolf Fikentscher et al

It is certified that error appears in the above-identified patent and that said Letters Patent are hereby corrected as shown below:

In the Heading of the patent, insert

--/30/ Foreign Application Priority Data

Germany P 20 18 970.2 April 21, 1970 --.

Signed and Sealed this twenty-third Day of March 1976

[SEAL]

Attest:

RUTH C. MASON
*Attesting Officer*

C. MARSHALL DANN
*Commissioner of Patents and Trademarks*